US012241443B2

(12) United States Patent
Harman

(10) Patent No.: US 12,241,443 B2
(45) **Date of Patent: *Mar. 4, 2025**

(54) TIP OVER ENGINE LOCKOUT SYSTEM

(71) Applicant: The Charles Machine Works, Inc., Perry, OK (US)

(72) Inventor: Jacob Harman, Stillwater, OK (US)

(73) Assignee: The Charles Machine Works, Inc., Perry, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 18/444,825

(22) Filed: Feb. 19, 2024

(65) Prior Publication Data

US 2024/0191679 A1 Jun. 13, 2024

Related U.S. Application Data

(63) Continuation of application No. 18/177,395, filed on Mar. 2, 2023, now Pat. No. 11,920,548.

(60) Provisional application No. 63/316,648, filed on Mar. 4, 2022.

(51) Int. Cl.

| | |
|---|---|
| ***F02N 11/08*** | (2006.01) |
| ***F02N 11/10*** | (2006.01) |
| *E02F 9/26* | (2006.01) |

(52) U.S. Cl.
CPC ........ *F02N 11/0803* (2013.01); *F02N 11/101* (2013.01); *E02F 9/264* (2013.01)

(58) Field of Classification Search
CPC ..... F02N 11/0803; F02N 11/101; E02F 9/264
See application file for complete search history.

(56) References Cited

U.S. PATENT DOCUMENTS

| | | | | |
|---|---|---|---|---|
| 2020/0197983 | A1* | 6/2020 | Alexander | B08B 3/02 |
| 2022/0266795 | A1* | 8/2022 | Hadano | F02N 11/0807 |

OTHER PUBLICATIONS

YouTube video uploaded Nov. 8, 2019, see Exhibit A.

* cited by examiner

*Primary Examiner* — Xiao En Mo
(74) *Attorney, Agent, or Firm* — Tomlinson McKinstry, P.C.

(57) ABSTRACT

A system for preventing an engine included in a work machine from restarting, after the work machine is tipped over. A sensor included in the work machine is configured to detect a tipping incident. If a tipping incident is detected, the sensor sends out a signal configured to shut down the engine and a tilt signal configured to prevent the engine from restarting. The engine is only restarted if certain steps are undertaken by an operator and a reset switch is activated.

20 Claims, 6 Drawing Sheets

TIP OVER ENGINE LOCKOUT SYSTEM

RELATED APPLICATIONS

This application is a Continuation of U.S. patent application Ser. No. 18/177,395, authored by Harman, and filed on Mar. 2, 2023, which claims the benefit of U.S. provisional patent application Ser. No. 63/316,648, authored by Harman, and filed on Mar. 4, 2022, the entire contents of which are incorporated herein by reference.

SUMMARY

The present disclosure is directed to a work machine having an ordinary operating condition and comprising an engine and a battery supported on a chassis. The work machine also comprises a starter supported on the chassis and electrically coupled to the engine and the battery, and a sensor supported on the chassis and configured to measure an amount of deviation of a current operating condition of the work machine from the ordinary operating condition of the work machine. The work machine further comprises a circuit interrupter electrically coupled to the sensor and positioned between the battery and the starter. The circuit interrupter is configured to interrupt a flow of electrical current from the battery to the starter if the amount of deviation measured by the sensor exceeds a predetermined threshold value.

The present disclosure is also directed to a work machine having an ordinary operating condition and comprising an engine having an engine controller unit and supported on a chassis. The work machine also comprises a starter supported on the chassis and electrically coupled to the engine control unit. The starter is configured to start the engine in response to receiving a start signal from the engine control unit. The work machine further comprises a sensor and a controller supported on the chassis. The sensor is configured to measure an amount of deviation of a current operating condition of the work machine from the ordinary operating condition of the work machine. The controller is electrically coupled to the sensor and the engine control unit and is configured to prevent the engine control unit from sending the start signal to the starter if the amount of deviation measured by the sensor exceeds a predetermined threshold value.

The present disclosure is further directed to a method comprising the steps of operating a work machine under an ordinary operating condition, deviating operation of the work machine from the ordinary operating condition, and measuring an amount of deviation from the ordinary operating condition using a sensor supported on the work machine. The method further comprises the steps of shutting down an engine included in the work machine if the amount of deviation measured by the sensor exceeds a predetermined threshold value, and preventing the engine from restarting if the amount of deviation measured by the sensor exceeds the predetermined threshold value.

DETAILED DESCRIPTION

Figure 1:
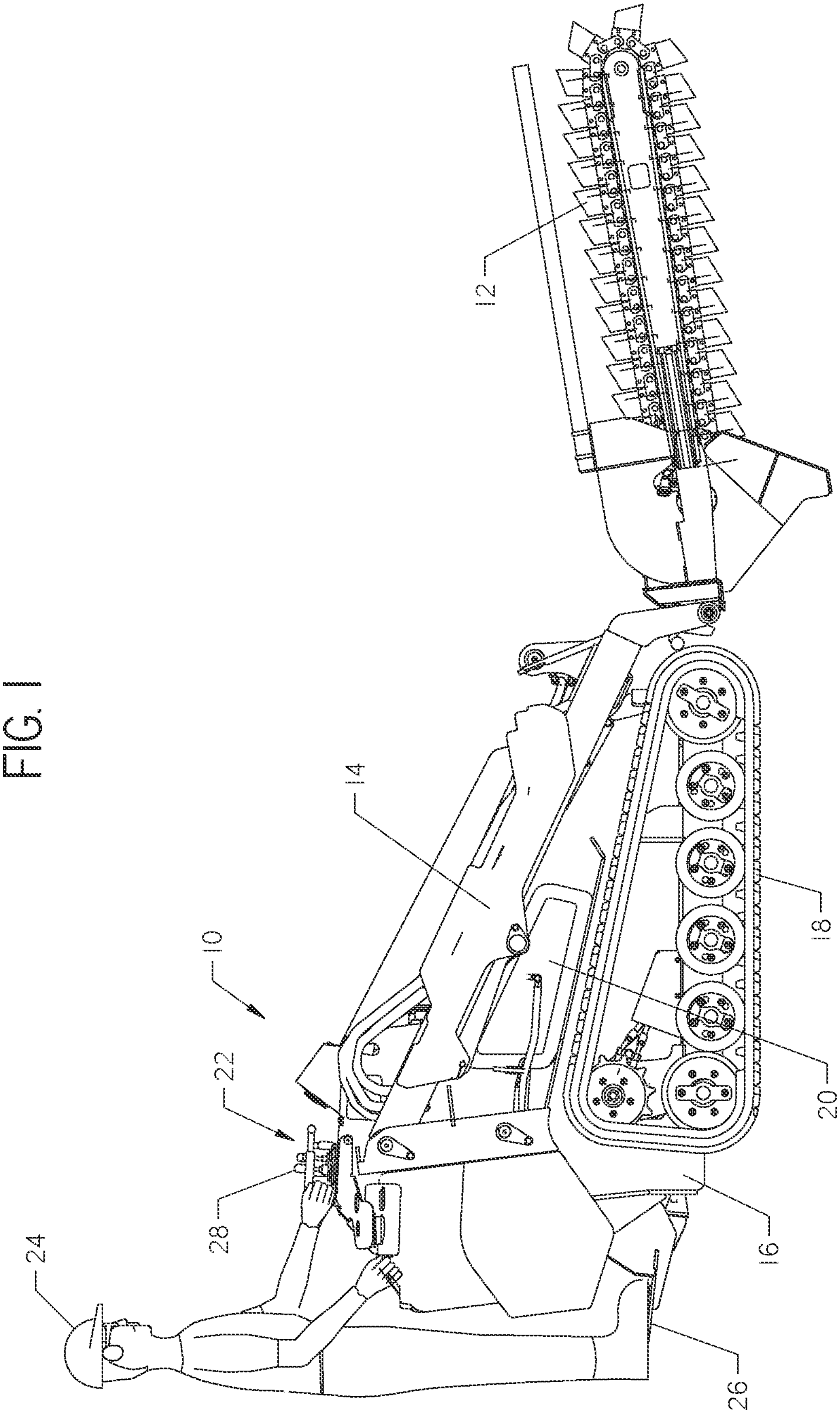
FIG. 1 is a side elevational view of a work machine having an operator situated at the machine's operator station.

Turning now to the figures, FIG. 1 shows a work machine 10. The work machine 10 is known in the art as a compact utility loader ("CUL") and is often used on residential worksites for projects like landscaping or installation of irrigation systems. The work machine 10 is often rented for short periods of use by a homeowner or construction worker. A work tool 12 is attached to the front end of the work machine 10 and is hydraulically operated using a plurality of lift arms 14. The work tool 12 shown in FIG. 1 is a trencher blade. The work tool 12 may be interchangeable with other work tools 12, such as a bucket, plow, etc. Alternatively, the work tool 12 may be integrated into the work machine 10, limiting the work machine 10 to a dedicated use.

Figure 2:
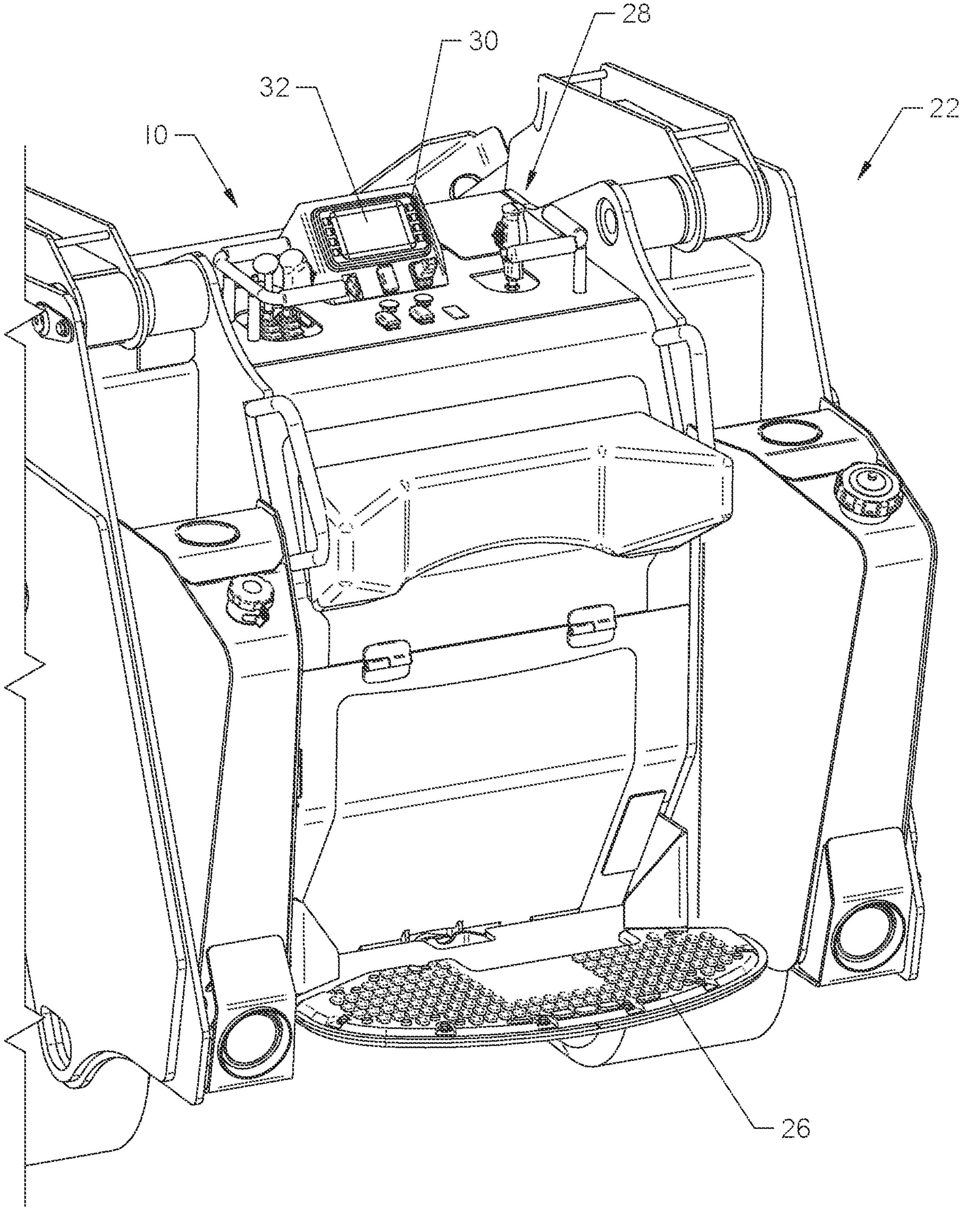
FIG. 2 is an enlarged and perspective view of the operator station of the work machine shown in FIG. 1.
Figure 3:
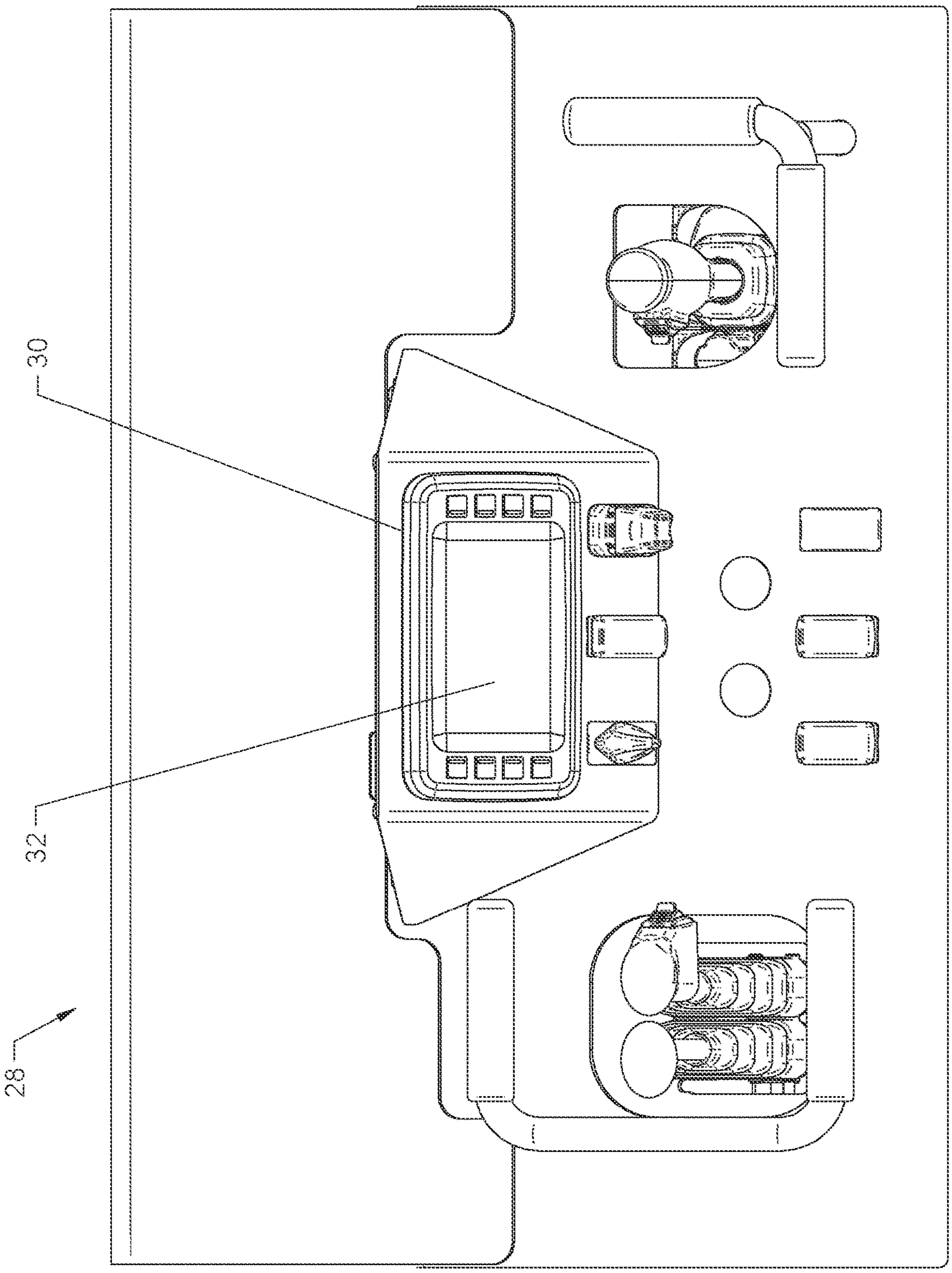
FIG. 3 is a top plan view of the control panel used with the operator station shown in FIG. 2.

Continuing with FIG. 1, the work machine 10 further comprises a chassis 16 supported on a ground drive or ground-engaging members 18. The ground drive 18 shown in FIG. 1 is a pair of endless tracks. In alternative embodiments, the ground drive 18 may comprise wheels and tires. The chassis 16 further supports an engine contained within an engine compartment 20, an operator station 22, and the lift arms 14. During operation, an operator 24 traditionally stands on a platform 26 supported on the chassis 16 at the rear end of the work machine 10 while manipulating a plurality of controls or a control panel 28 included in the operator station 22. The operator station 22 may further comprise an interface 30 having a display 32, as shown in FIGS. 2 and 3.

The work machine 10 further comprises a plurality of fluid systems contained within the engine compartment 20, such as a fuel tank, hydraulic fluid, and other non-compressible fluids needed to operate the work machine 10. During operation, gravity keeps the various fluids within their designated areas. For example, fuel remains within the fuel tank and hydraulic fluid and other non-compressible fluids remain out of the combustion fuel system. However, if the work machine 10 were to tip over or almost tip over (hereinafter referred to as a "tipping incident"), the various fluids may leak past seals and into other parts of the engine compartment 20, potentially causing damage to the work machine 10. For example, a non-compressible fuel passing through a combustion engine may cause significant damage to engine parts.

If a non-compressible fluid were to leak into the combustion fuel system after a tipping incident, an engine flush would be necessary prior to restarting the work machine 10 to avoid engine damage. However, an operator not familiar with the work machine 10 may not appreciate this fact. In some cases, operators have been known to immediately restart the engine after a tipping incident, causing permanent damage and requiring replacement of the engine.

The present application discloses various embodiments of a "tip over engine lockout system". If a tipping incident is detected, the disclosed systems are each configured to stop operation of the engine and prevent the engine from restarting until certain steps are undertaken by the operator 24. A first embodiment of a tip over engine lockout system 100 is shown in FIG. 4, and a second embodiment of a tip over engine lockout system 200 is shown in FIG. 5.

Figure 4:
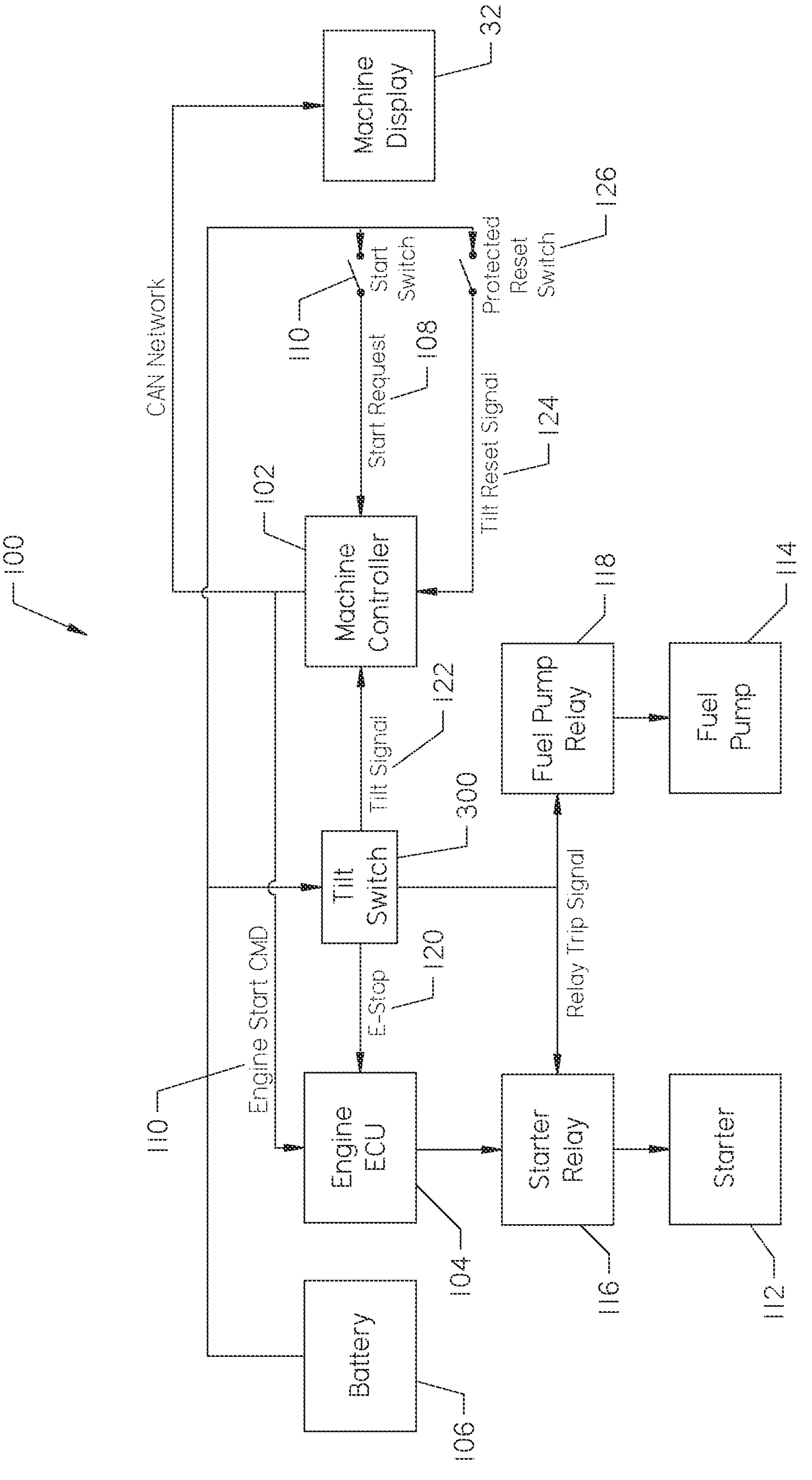
FIG. 4 is a diagram of one embodiment of a tip over engine lockout system disclosed herein.
Figure 5:
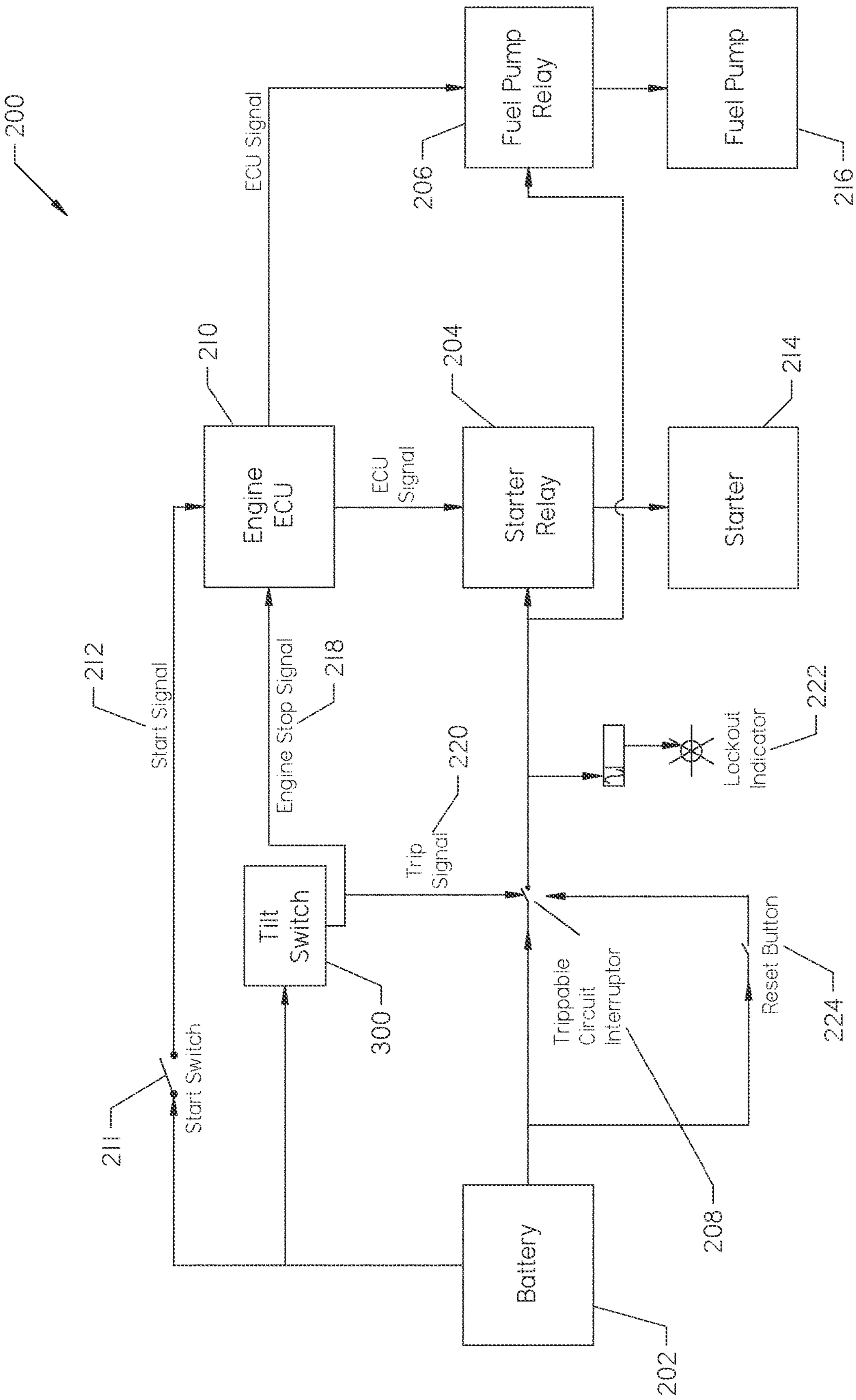
FIG. 5 is a diagram of another embodiment of a tip over engine lockout system disclosed herein.

Continuing with FIGS. 4 and 5, each system 100 and 200 comprises one or more sensor(s) 300 supported on the chassis 16 and configured to detect a tipping incident. The sensor 300 shown in FIGS. 4-7 is labeled as a "tilt switch". However, the sensor 300 may comprise any number of sensors configured to detect a tipping incident, such as a mechanical tilt sensor, the electric tilt switch, an accelerometer, and/or a gyroscope. The tilt sensor or switch may measure an angle at which the work machine 10 is titled relative to an absolute level plane. The accelerometer or gyroscope may measure a change in the speed or angular velocity at which the work machine 10 is being moved. Other sensors known in the art and configured to detect or measure an amount of deviation of a current operating condition or orientation of work machine 10 from the ordinary operating condition or orientation of the work machine 10 may also be used.

Continuing with FIG. 4, the tip-over engine lockout system 100 utilizes a machine controller 102 or controller logic to lockout the engine. The machine controller 102 is supported on the chassis 16 and is in communication with or electrically coupled to the work machine's display 32, the sensor 300, and the engine's electronic control unit (ECU) 104. The machine controller 102 is powered by a battery 106 housed in the engine compartment 20.

During ordinary operation, the machine controller 102 receives a start request 108 from a start switch 110 located at the operator station 22. Upon receiving the start request 108, the machine controller 102 sends an engine start command 110 to the engine ECU 104. The engine ECU 104 then starts operation of a starter 112 and a fuel pump 114 in communication with or electrically coupled to the engine, thereby starting the engine. The engine ECU 104 starts operation of the starter 112 via a starter relay 116 and starts operation of the fuel pump 114 via a fuel pump relay 118.

If the sensor 300 detects a tipping incident during operation, the sensor 300 sends an engine stop signal 120 to the engine ECU 104, directing the engine to shut down. The sensor 300 likewise sends a tilt signal 122 to the machine controller 102 indicating that a tipping incident has been detected. The machine controller 102 in turn sends a lockout signal to the engine ECU 104. The lockout signal is configured to prevent the engine ECU 104 from sending a start signal to the starter 112 via the starter relay 116 and from sending a start signal to the fuel pump 114 via the fuel pump relay 118. The machine controller 102 continues to prevent any attempts at starting the engine until the machine controller 102 receives a tilt reset signal 124 from a tilt reset switch 126 located at the operator station 22. In addition to activating the tilt reset switch 126, the operator 24 may need to acknowledge one or more notifications shown on the display 32 using human input on the interface 30, shown in FIGS. 2 and 3. For example, the notifications may ask the operator 24 to confirm that the engine has been inspected for fluid leaks, that the engine has been flushed, that the operator 24 has consulted the operator manual, etc. If desired, the tilt reset switch 126 may only be activated if the operator 24 has first acknowledged the one or more notifications. Alternatively, the tilt reset switch 126 may be located behind a locked panel supported on the chassis 16, thereby forcing the operator 24 to examine the engine and/or engine compartment 20 prior to restarting the engine. Forcing the operator 24 to go through detailed steps prior to activating the tilt reset switch 126 prevents the operator 24 from immediately restarting the engine following a tipping incident.

If the sensor 300 detects a tipping incident, a warning signal may be shown on the display 32 indicating that a tipping incident has occurred, and the engine will not restart. In addition, the control panel 28 or the interface 30 may produce an audible alarm and/or flashing lights for the operator 24, indicating that a tipping incident has occurred, and the engine will not restart.

During operation, the sensor 300 may be set to only send out an engine stop signal 120 and a tilt signal 122 when the sensor 300 detects that the work machine 10 has tilted a certain angle from vertical. For example, the signals 120 and 122 may be sent if the work machine 10 has titled at least 30 degrees from vertical. As another example, the signals 120 and 122 may only be sent if the work machine 10 has titled at least 70 degrees from vertical.

The sensor 300 may be set to activate at any angle desired, such as any angle between 0 and 90 degrees, but it is advantageous to not trigger the sensor 300 at angles associated with normal operation and a low risk of fluid intrusion. The angles at which the work machine 10 may be safely operated may vary from machine to machine. Therefore, the sensor 300 is preferably configurable to desired angles or a predetermined threshold value. Preferably, the threshold value is one that would indicate that the center of mass of the work machine 10 is outside of the footprint of the work machine's ground-engaging members 18. Such orientation likely results in the work machine's 10 uncontrolled tipping and a tipping incident.

In some cases, the sensor 300 may be susceptible to short deviations in measured conditions. Therefore, the sensor 300 may be configured to only send the engine stop signal 120 and the tilt signal 122 after a delay period following a measurement that exceeds the predetermined threshold value. The delay period may be one second, for example. If the sensor 300 still measures a value that exceeds the threshold value after the delay period, the signals 120 and 122 may be sent. Providing for a delay period prevents unnecessary trigging of the signals 120 and 122 and shutting down of the work machine 10 during operation.

Figure 6:
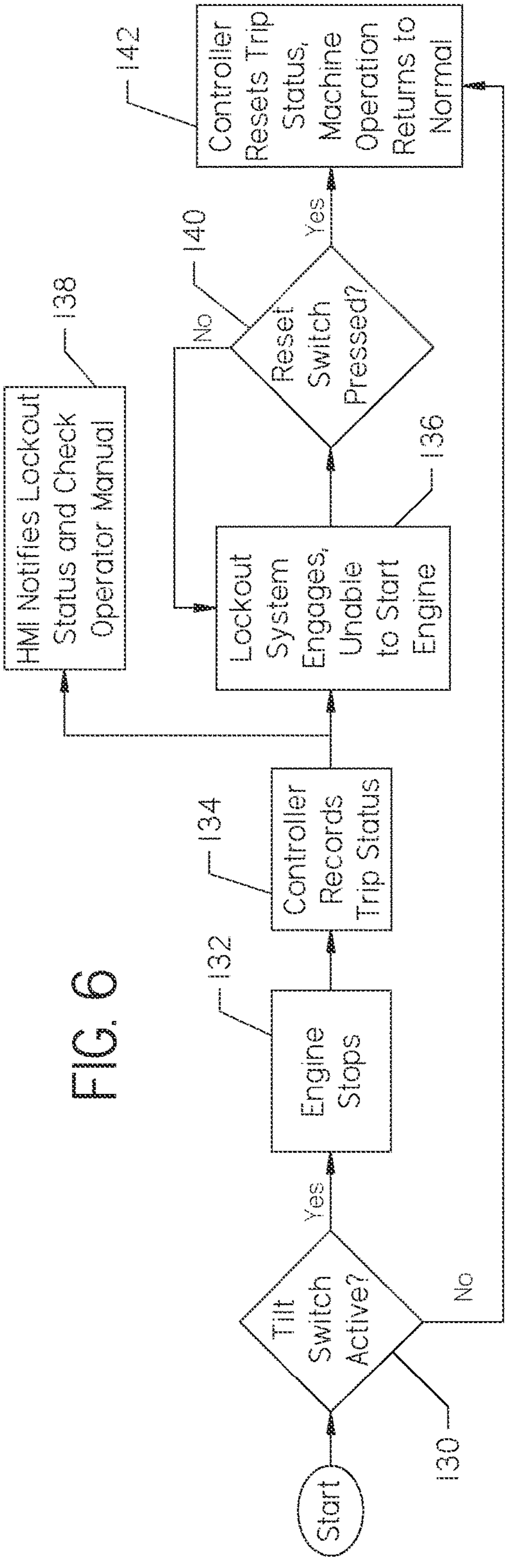
FIG. 6 is a flow chart depicting a method of using the tip over engine lockout system shown in FIG. 4.

Turning to FIG. 6, one method of utilizing the system 100 is shown. To start, the work machine 10 has tipped over, activating the tilt switch 300 at step 130. The engine is stopped at step 132 and the machine controller 102 is sent a tilt signal 122 at step 134. The machine controller 102 then sends a signal preventing the engine from restarting, thereby engaging "the lockout system" in step 136. At the same time, as shown by step 138, the machine controller 102 directs the interface 30 and the display 32 to notify the operator 24 of the status of the work machine 10 and indicates steps for the operator 24 to take prior to restarting the engine. The work machine 10 is only restarted if the reset switch 126 is activated, as shown in steps 140 and 142.

Turning back to FIG. 5, the tip-over engine lockout system 200 is shown. The system 200 utilizes the sensor 300 in the same manner as the system 100, but the system 200 comprises another method of locking out the engine. In contrast to the system 100, the system 200 does not utilize a machine controller 102 or controller logic to activate the engine lockout. Instead, the system 200 utilizes system logic via a physical disconnect between a battery 202 and a starter relay 204 and a fuel pump relay 206. The battery 202 provides power to the sensor 300, the starter relay 204, and the fuel pump relay 206. A trippable circuit interrupter 208 is positioned within the electrical or communication pathway of the battery 202 and the starter and fuel pump relays 204 and 206. The sensor 300 is in communication with or is electrically coupled to the circuit interrupter 208 and an engine ECU 210.

In ordinary operation, a start signal 212 is sent to the engine ECU 210 by a start switch 211 located at the operator station 22. The engine ECU 210 in turn directs a starter 214 and a fuel pump 216 to start, thereby starting the engine. The engine ECU 210 starts the starter 214 via the starter relay 204 and starts the fuel pump 216 via the fuel pump relay 206. If the sensor 300 detects a tipping incident, the sensor 300 sends an engine stop signal 218 to the engine ECU 210, thereby stopping the engine. At the same time, the sensor 300 sends a trip or tilt signal 220 to the circuit interrupter 208, causing the circuit interrupter 208 to trip, thereby cutting the power feed or the flow of electrical current from the battery 202 to the starter and fuel pump relays 204 and 206. Without power to the starter relay 204 and the fuel pump relay 206, the starter 214 and fuel pump 216 cannot be started, thereby preventing the engine from starting.

The system 200 may be configured to illuminate a light or lamp representing a lockout indicator 222 on the control panel 28. In order to restart the engine, the operator 24 may have to flip or activate a circuit reset switch or button 224 located on the circuit interrupter 208. The reset switch 224 may only be accessible by removing a locked panel on the engine compartment 20. Resetting the circuit interrupter 208 requires the performance of detailed steps, of which should cause the operator 24 to consult the operator manual and inspect the engine before restarting. Such detailed steps may include the removal of panels and accessing portions of the engine compartment 20 that require special tools. Warning labels may also be included on or near the circuit interrupter 208 warning the operator 24 to inspect the engine before restarting.

Figure 7:
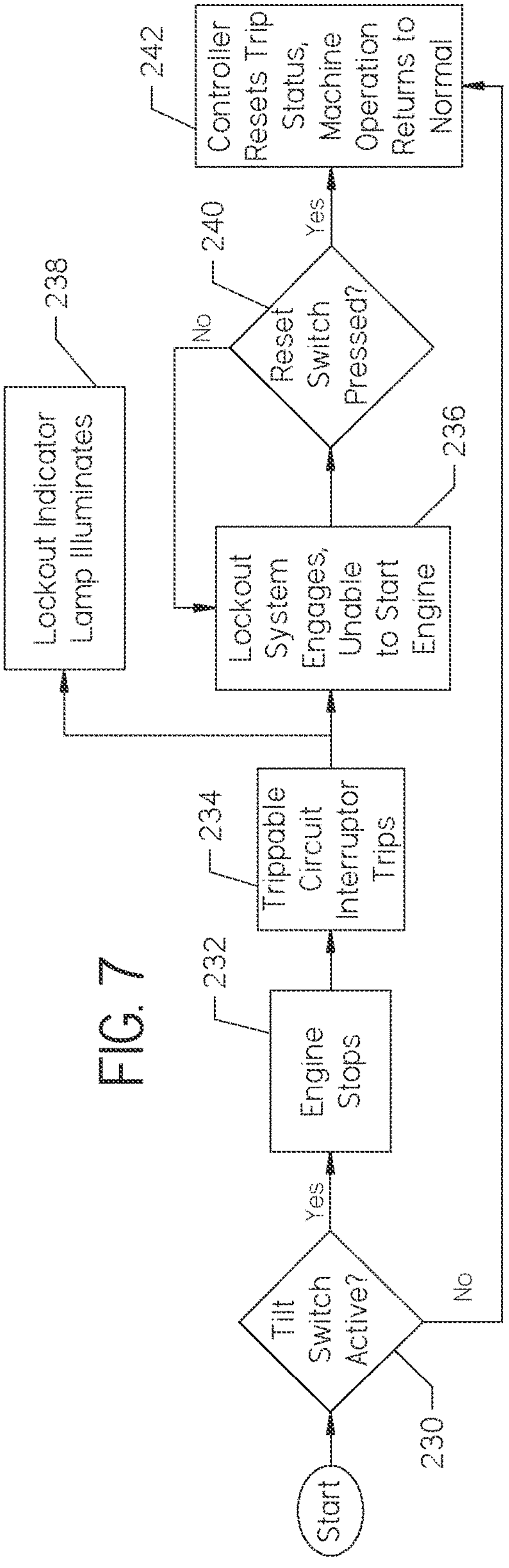
FIG. 7 is a flow chart depicting a method of using the tip over engine lockout system shown in FIG. 5.

Turning to FIG. 7, one method of utilizing the system 200 is shown. To start, the work machine 10 has tipped over, activating the tilt switch 300 at step 230. The engine is stopped at step 232 and the trippable circuit interrupter 208 trips at step 234. The battery 202 can no longer power the starter and fuel pump relays 204 and 206, thereby preventing the engine from restarting and engaging "the lockout system" in step 236. At the same time, as shown by step 238, the lockout indicator light 222 illuminates. The work machine 10 is only restarted if the reset switch 224 is activated, as shown in steps 240 and 242.

In alternative embodiments, other methods known in the art and not specifically disclosed herein of preventing the engine from restarting may be used. For example, other methods of physically interrupting communication within the engine start system may be used. Alternatively, other methods of using the controller logic to prevent the engine from restarting may be used.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A work machine having an ordinary operating condition, the work machine comprising:
- a chassis;
- an engine supported on the chassis; and
- a sensor supported on the chassis and configured to measure an amount of deviation of a current operating condition of the work machine from the ordinary operating condition of the work machine;
- in which the sensor is configured to direct the engine to shut down if the amount of deviation measured by the sensor exceeds a predetermined threshold value; and
- in which the engine is prevented from restarting if the amount of deviation measured by the sensor exceeds a predetermined threshold value.

2. The work machine of claim 1, further comprising:
- a controller supported on the chassis and in communication with the sensor;
- in which the controller is configured to prevent the engine from restarting.

3. The work machine of claim 1, further comprising:
- a circuit interrupter in communication with the sensor;
- in which the circuit interrupter is configured to prevent the engine from restarting.

4. The work machine of claim 1, in which the sensor is a tilt sensor configured to measure an angle at which the work machine is titled relative to an absolute level plane.

5. The work machine of claim 4, in which the predetermined threshold value is an angle within the range of 0-90 degrees.

6. The work machine of claim 1, further comprising:
- a reset switch configured to allow the engine to restart if the engine was shut down in response to the amount of deviation measured by the sensor exceeding the predetermined threshold value.

7. The work machine of claim 1, further comprising:
- a control panel supported on the chassis and comprising an indicator light;
- in which the indicator light is illuminated if the engine was shut down in response to the amount of deviation measured by the sensor exceeding the predetermined threshold value.

8. The work machine of claim 6, further comprising:
- a control panel supported on the chassis and comprising an interface having a display;
- in which the reset switch is located on the control panel.

9. The work machine of claim 8, in which the display is configured to show one or more warning notifications to an operator if the engine was shut down in response to the amount of deviation measured by the sensor exceeding the predetermined threshold value.

10. A work machine having an ordinary operating condition, the work machine comprising:
- a chassis;
- an engine supported on the chassis;
- a starter in communication with the engine;
- a sensor supported on the chassis and configured to measure an amount of deviation of a current operating condition of the work machine from the ordinary operating condition of the work machine; and
- a circuit interrupter in communication with the sensor and the starter;
- in which the sensor is configured to direct the engine to shut down if the amount of deviation measured by the sensor exceeds a predetermined threshold value; and in which the circuit interrupter is configured to prevent the starter from restarting the engine if the amount of deviation measured by the sensor exceeds the predetermined threshold value.

11. The work machine of claim 10, further comprising:

a battery supported on the chassis and in communication with the starter and the circuit interrupter;

in which the circuit interrupter is configured to prevent the starter from restarting the engine by interrupting a flow of electrical current from the battery to the starter.

12. The work machine of claim 10, in which the sensor is a tilt sensor.

13. The work machine of claim 12, in which the sensor is an accelerometer.

14. The work machine of claim 10, further comprising:

a reset switch configured to allow the starter to restart the engine if the circuit interrupter has prevented the starter from restarting the engine.

15. A work machine having an ordinary operating condition, the work machine comprising:

a chassis;

an engine supported on the chassis;

a starter in communication with the engine;

a sensor supported on the chassis and configured to measure an amount of deviation of a current operating condition of the work machine from the ordinary operating condition of the work machine; and a controller supported on the chassis and in communication with the sensor and the starter;

in which the sensor is configured to direct the engine to shut down if the amount of deviation measured by the sensor exceeds a predetermined threshold value; and in which the controller is configured to prevent the starter from restarting the engine if the amount of deviation measured by the sensor exceeds the predetermined threshold value.

16. The work machine of claim 15, in which the controller prevents the starter from restarting the engine by preventing a start signal from being sent to the starter.

17. The work machine of claim 15, in which the sensor is a tilt sensor.

18. The work machine of claim 15, in which the sensor is an accelerometer.

19. The work machine of claim 15, further comprising:

a fuel pump supported on the chassis and in communication with the engine;

in which the controller is also configured to prevent the fuel pump from pumping fuel into the engine if the amount of deviation measured by the sensor exceeds the predetermined threshold value.

20. The work machine of claim 15, further comprising:

a reset switch configured to direct the controller to allow the starter to restart the engine if the controller has prevented the starter from restarting the engine.

* * * * *